United States Patent [19]
Radjabi et al.

[11] Patent Number: 5,721,737
[45] Date of Patent: Feb. 24, 1998

[54] SERIAL TRANSMISSION SYSTEM FOR CONTROLLING A NETWORK OF I/O DEVICES

[75] Inventors: Bahman Radjabi; Sergio Shoji, both of San Jose; Mary Nagata, Arcadia, all of Calif.

[73] Assignee: SMC Pneumatics, Inc., San Jose, Calif.

[21] Appl. No.: 437,320

[22] Filed: May 9, 1995

[51] Int. Cl.⁶ .................... H04J 3/02; H04L 12/403
[52] U.S. Cl. .............. 370/449; 370/475; 364/514 R; 340/825.08
[58] Field of Search .................. 370/85.1, 85.9, 370/85.11, 449, 475; 340/825.07, 825.08; 364/514 R; 349/825.06

[56] References Cited

U.S. PATENT DOCUMENTS

| | | | |
|---|---|---|---|
| 3,633,165 | 1/1972 | Gilbert | 370/85.9 |
| 4,271,505 | 6/1981 | Menot et al. | 370/85.1 |
| 4,423,506 | 12/1983 | Kawasaki et al. | 370/85.9 |
| 4,569,045 | 2/1986 | Schieble et al. | 370/85.9 |
| 4,633,245 | 12/1986 | Blount et al. | 340/825.03 |
| 4,796,025 | 1/1989 | Farley et al. | 340/825.08 |
| 4,805,197 | 2/1989 | Van Der Jagt et al. | 375/110 |
| 4,808,994 | 2/1989 | Riley | 340/825.57 |
| 4,847,867 | 7/1989 | Nasu et al. | 375/36 |
| 5,056,084 | 10/1991 | LaCorre | 370/99 |
| 5,181,201 | 1/1993 | Schauss et al. | 370/85.1 |
| 5,191,582 | 3/1993 | Upp | 370/94.1 |
| 5,191,583 | 3/1993 | Pearson et al. | 370/94.1 |
| 5,260,936 | 11/1993 | Bardet et al. | 370/61 |
| 5,266,943 | 11/1993 | Ise et al. | 340/825.05 |
| 5,270,972 | 12/1993 | Craig et al. | 365/189 |
| 5,274,311 | 12/1993 | Littlejohn et al. | 318/562 |
| 5,283,781 | 2/1994 | Buda et al. | 370/13.1 |
| 5,287,353 | 2/1994 | Buda et al. | 370/85.1 |
| 5,289,176 | 2/1994 | Novakovich et al. | 340/825.08 |

OTHER PUBLICATIONS

Information technology—Telecommunications and information exchange between systems—High–level data link control (HLDC) procedures—Classes of procedures, Reference number ISO/IEC 7809:1991.

Synchronous Data Link Control, IBM, Jun. 1986.

*Primary Examiner*—Douglas W. Olms
*Assistant Examiner*—Min Jung
*Attorney, Agent, or Firm*—Peter K. Hahn, Esq.

[57] ABSTRACT

A serial transmission system for controlling a network of input/output devices is provided. The serial transmission system includes: a three wire serial link; a master unit for controlling communication over the serial link; multiple input remote units for receiving information from the input devices; and multiple output remote units for controlling the output devices. The master unit includes a programmable optically isolated microcontroller adapted to initiate a synchronous data link control (SDLC) communications protocol with the remote units. In addition the master unit includes memory tables for storing input/output, error, diagnostic, status and node availability information. This information can be shared with a PC or host controller. In addition, the PC or host controller can include programs for directing the master unit and remote units to initialize, reset, scan, or maintain an idle condition.

20 Claims, 7 Drawing Sheets

SERIAL TRANSMISSION SYSTEM FOR CONTROLLING A NETWORK OF I/O DEVICES

FIELD OF THE INVENTION

This invention relates to electrical control systems and more particularly to a serial transmission system for controlling input/output (I/O) devices arranged in a network.

Background of the Invention

In various industrial processes input/output devices are routinely used to control machinery and systems associated with the process. Input devices include sensors for temperature and pressure, motion detectors, and various switches (e.g., position, on/off, pressure). Output devices include motors, valves, relays, and various actuators. In the past, each output device was wired separately to one or more controllers located at a central location. Since the input/out devices are typically located on or near the process equipment or machinery, this required a large amount of expensive and bulky wiring.

Recently electromechanical control systems have included control modules located on or near the process equipment to control several input/output devices (e.g., sixteen input/output devices per control module). The control modules interface with a centrally located programmable logic controller (PLC) which controls the network of control modules. In order to avoid a separate wiring path from the PLC to each control module, various communication systems have been proposed for interconnecting the control modules. These communication systems form a data link that allows data to be transmitted to and from the control modules to the PLC.

With such a system, the PLC must uniquely address each control module in order to transmit or receive data from that control module. Each control module in turn must recognize data being transmitted from the PLC and must be able to mark data for transmission back to the PLC. Provisions must also be made for the detection of errors in the data link.

In even relatively simple industrial operations these communication systems can become quite complex. In particular, the connecting lines from the PLC to the control modules can require several separate wires for each control module. In addition, response times can be a problem because of the length of the connecting lines and the time required for address decoding and error detection. Furthermore, error correction is often difficult and maintenance and trouble shooting of the system can be complicated and expensive. The present invention is directed to a serial transmission system that overcomes many of the problems associated with prior art transmission systems for electromechanical control systems.

Objects of the Invention

Accordingly it is an object of the present invention to provide an improved serial transmission system for controlling a network of input/output devices such as an electromechanical control system.

It is a further object of the present invention to provide an improved serial transmission system that includes error detection and diagnostic capability and an improved communications protocol.

It is yet another object of the present invention to provide an improved serial transmission system operable with a simplified wiring format that uses a 3-wire serial link.

It is yet another object of the present invention to provide a high speed serial transmission system that can provide data links of several hundred meters or longer and with a variable transmission speed.

It is still another object of the present invention to provide an improved serial transmission system operable to control and monitor the activities of a network comprising several hundred or more sensors and actuators.

Other objects, advantages and capabilities of the present invention will become more apparent as the description proceeds.

SUMMARY OF THE INVENTION

In accordance with the present invention an improved serial transmission system for controlling a network of input/output devices is provided. The improved system includes a master unit and multiple remote units connected in a serial link. The master unit controls communications over the link. The remote units actuate and receive input from various input/output devices (e.g., motors, sensors, switches).

The master unit includes an optically isolated micro controller and a transceiver in electrical communication with the serial link. In a first embodiment the master unit comprises a plug-in card adapted for connection to a personal computer (PC) using a standard ISA bus. In a second embodiment the master unit comprises a stand alone unit adapted for connection to a host controller. The PC or host controller will typically control an entire industrial process including the master unit.

The remote units are either output or input types. The output remote units direct control commands to actuating devices such as solenoid valves. The input remote units retrieve sensing signals from sensors and switches. Each remote unit is capable of handling multiple discrete input/output devices (e.g., 16).

The serial link is formed as a 3-wire cable including a twisted pair of wires for the signal high and signal low, a ground wire, and a shield. The master unit and the remote units connect to the serial link using standard transceivers so that the voltage across the serial link is balanced. In addition, the PC or host controller is isolated from the serial link by optocouplers and an isolated DC/DC converter built into the master unit. The remote units are powered by an independent power supply and are isolated from the input and output devices by optocouplers.

The communication protocol for the system is a master/slave configuration. The master unit controls the remote units (slaves) by coordinating data flow to and from the remote units. Each remote unit comprises a node of the serial link and is addressable using a primary address. In addition, each group of remote units (e.g., input group or output group) have an associated group address. Moreover, a broadcast address can be used to address all of the available remote units at one time. With this communications protocol, there are two basic modes of operation (normal response mode and broadcast mode). In the normal response mode, the master unit transmits a command to only one remote unit and expects a reply from the remote unit. In the broadcast mode, the master unit transmits a command to all the available remote units at once and does not expect a reply.

Transmission frames are 64 bits long, each frame comprises 6 individual fields based on the Synchronous Data Link Control (SDLC) frame format. The control field's CONTs are constructed in accordance with a predefined set of commands and responses specific to pneumatic control operations. The command frames (from master unit to remote units) are constructed using an 8-bit control field CONT Therefore each command or response frame has an associated CONT byte.

DETAILED DESCRIPTION OF THE PREFERRED EMBODIMENTS

Figure 1:
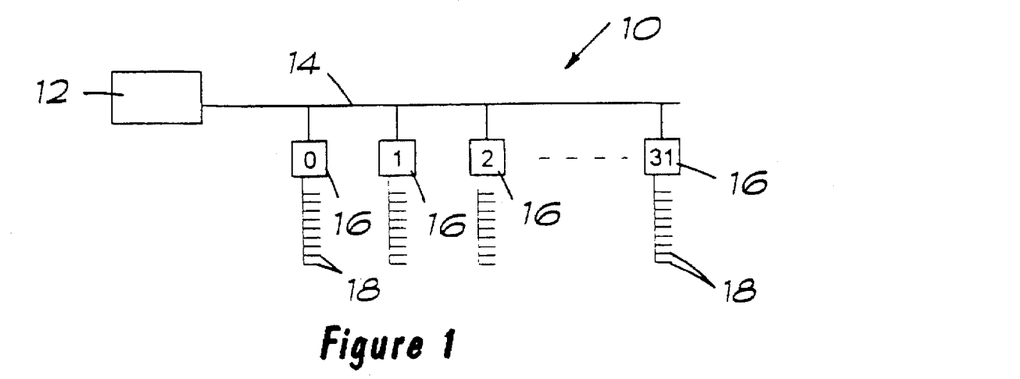
FIG. 1 is a schematic diagram of a serial transmission system constructed in accordance with the invention including a master unit and remote units connected by a serial link.

Referring to FIG. 1, a serial transmission system 10 constructed in accordance with the invention is shown. The serial transmission system 10 includes a master unit 12 connected by a serial link 14 to a plurality of remote units 16. The master unit 12 controls the flow of data to and from the remote units 16 and includes internal memory tables and registers for storing data. In addition, the master unit 12 includes firmware for initiating and terminating various operational sequences for implementing a Synchronous Data Link Control (SDLC) communications protocol.

The master unit 12 includes microprocessing means in the form of a programmable 8-bit microcontroller (e.g., Intel 80C152). The microcontroller controls data signals over the serial link 14 and maintains the memory tables. The master unit 12 also includes a transceiver for signal conversion and coding between the master unit 12 and the serial link 14 and to provide a balanced voltage in accordance with standard protocol. By way of example the transceiver can be an RS-485 transceiver. RS-485, also known as EIA-485, is an industry standard fro the "Electronic Industries Association". It defines the impedances, voltage levels and connection topology as well as the characteristics of the transceivers for the physical link. RS-232 is another standard which is most common for computer peripherals such as mouse and modem. In an RS-232 line, there are only two nodes and the signal levels are specified for a typical office or laboratory environment. In contrast, RS-485 can have several nodes (up to 32) and the signal levels are defined in such a way to provide an inherent noise immunity. RS-485 is most common for industrial applications and factory automation. Another related standard is RS-422 which is basically the industrial version of RS-232.

In addition, the master unit 12 includes a dual ported RAM to permit sharing of input/output information compiled by the master unit 12 with a dual-part-RAM (external RAM). Additionally, the master unit 12B is configured to provide different transmission rates selectable by manual switches (e.g., DIP switches) or by software commands. Each of these components for the master unit 12 will be explained further as the description proceeds.

Figure 2A:
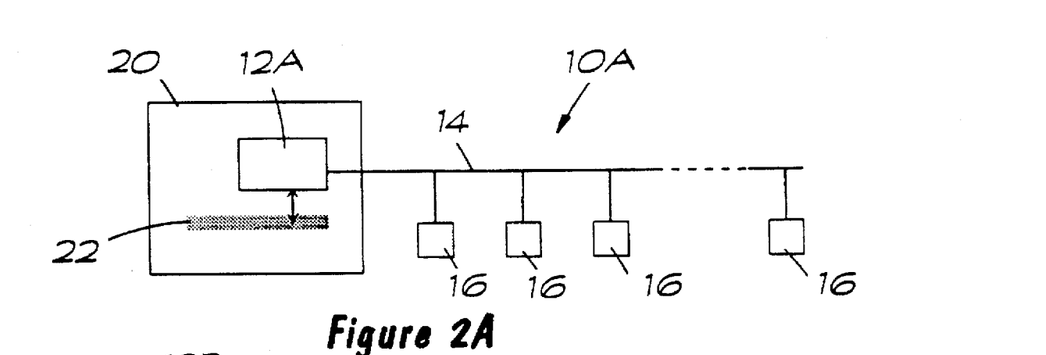
FIG. 2A is a schematic diagram showing a first embodiment of the invention in which the master unit is constructed as a plug in card.
Figure 2B:
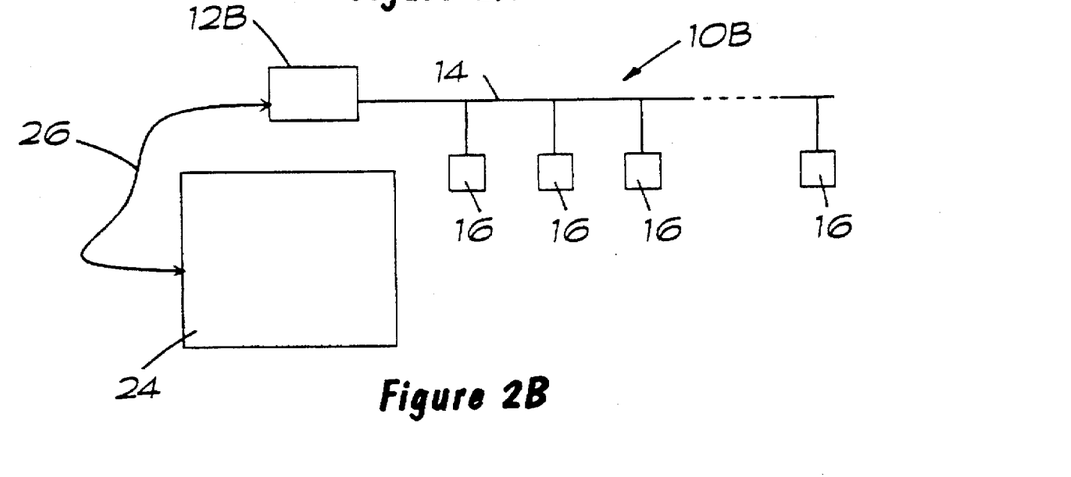
FIG. 2B is a schematic diagram showing a second embodiment of the invention in which with the master unit interfaces with a host controller.

FIGS. 2A and 2B illustrate different embodiments of the invention. In FIG. 2A, the master unit 12A is fabricated as a plug-in card adapted for connection to a personal computer (PC) 20 via an ISA bus 22. The ISA bus 22 is constructed according to Industry Standard Bus Architecture (ISA). In FIG. 2B the master unit 12B is fabricated as a stand alone unit in communication with a host controller 24. A transceiver 26 (e.g., RS-232) interconnects the master unit 12 with the host controller 24. The host controller 24 will typically be a computer overseeing an entire manufacturing or industrial process.

With either embodiment, an operator or a control program working through the PC 20 or host controller 24 can have direct access to the shared portions of the master unit's memory tables. This allows sharing of the input/output, error, diagnostics, status, and node availability information with the PC 20 or host controller 24. In addition, the PC 20 or host controller 24 can be set up to configure the master unit's initial settings and force it to reset, initialize, or scan.

Figure 3:
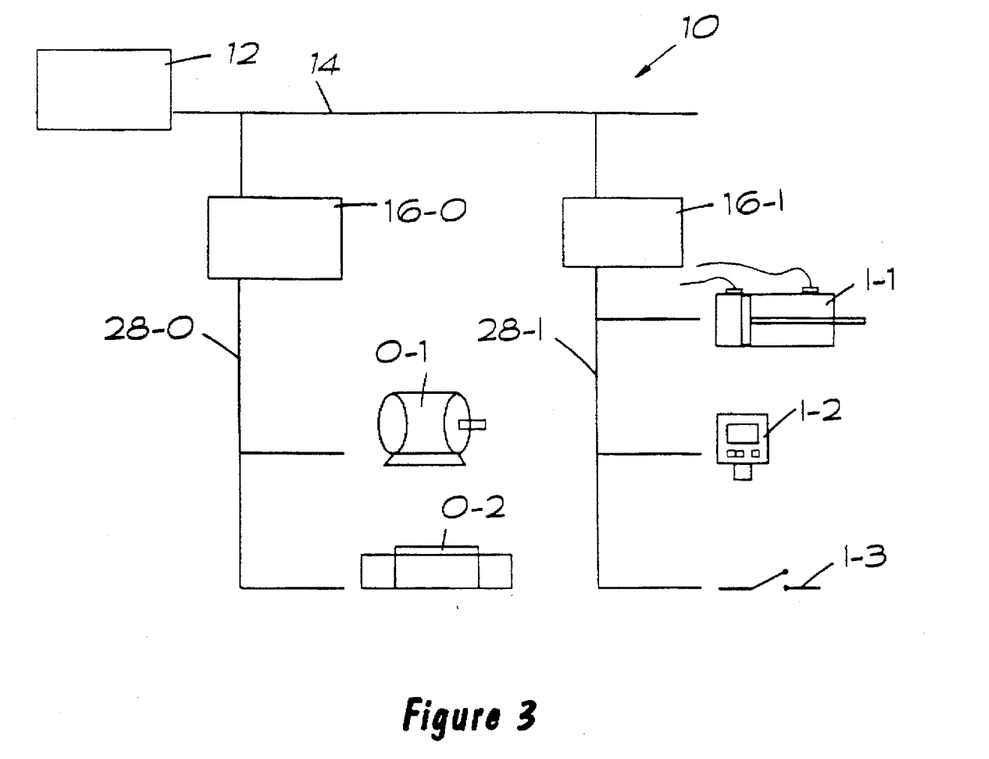
FIG. 3 is a schematic diagram showing the system configuration with various output devices connected to a remote output unit and various input devices connected to a remote input unit.

Referring now to FIG. 3, the two types of remote units 16 are shown. These include output remote units 16-O and input remote units 16-I connected to the serial link 14. The output remote units 16-O direct control commands to actuating devices (O-1)-(O-2) while the input remote units 16I retrieve sensing signals from sensors and switches (I-1)-(I-3). In the illustrative embodiment, each remote unit 16-I or 16-O is capable of handling up to sixteen discrete input or output devices. By way of example, output devices O-1 is a DC motor and output device O-2 is a solenoid valve. These output devices are connected via output drop line 28-0 to the output remote unit 16-O. In a similar manner, input devices I-1 (limit switches), I-2 (pressure switch) and I-3 (on-off switch) are connected via input drop line 28-I to input remote unit 16-I. The remote units 16-O and 16-I include external housings that are small enough to be placed on or near the process equipment. The drop lines 28-0, 28-I from the remote units 16-O, 16-I to the output devices (O-1)-(O-2) or input devices (I-1)-(I-3), are thus only several meters or less in length. Each remote unit 16 includes microprocessing means in the form of an optically isolated microcontroller and a transceiver for interface with the serial link 14. The hardware for the remote units 16 will be more fully explained as the description proceeds.

Figure 4:
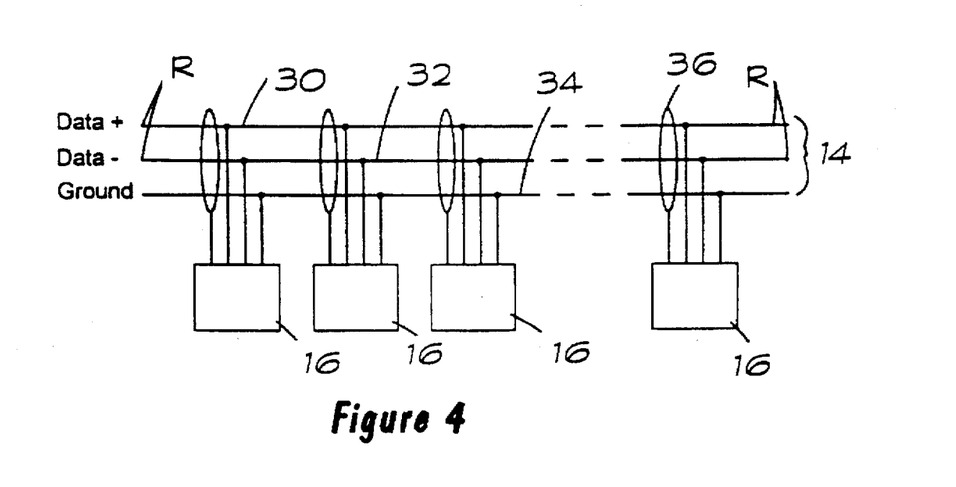
FIG. 4 is a schematic diagram illustrating the construction of the serial link using three wire shielded cable.

With reference to FIG. 4, the serial link 14 is formed as a shielded twisted pair cable (i.e., 3 wire cable). A signal high wire 30 transmits data (+). A signal low wire 32 transmits data (-). A ground wire 34 connects to ground. An insulating shield 36 surrounds the wires 30, 32 and 34. The maximum length of the serial link 14 is dependent on the transmission rate. At a maximum rate of 2 megabytes per second (mbps), the serial link 14 can be up to 100 meters long. At a minimum rate of 100 kilo bits per second (kbps), the serial link 14 can be as long as 750 meters. The serial link 14 includes resistors (R) at each terminating end. In the illustrative embodiment the resistors (R) are 120 ohm.

Figure 5A:
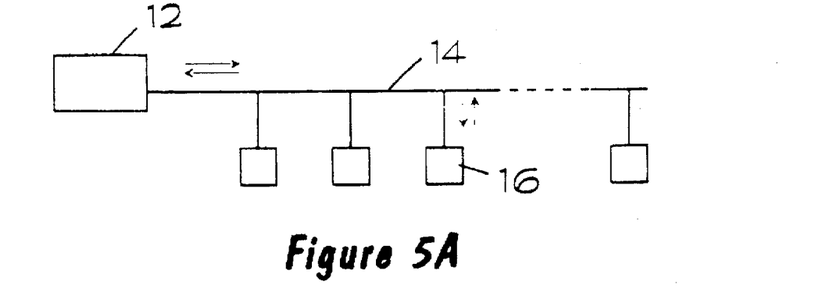
FIG. 5A is a schematic diagram illustrating a normal response mode of a remote unit.
Figure 5B:
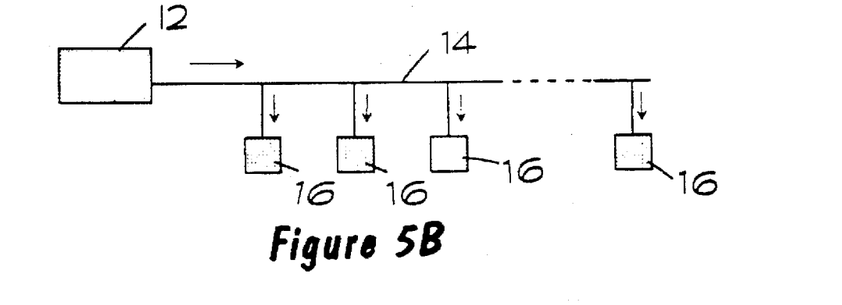
FIG. 5B is a schematic diagram illustrating a normal broadcast mode from the master unit to the remote units.
Figure 5C:
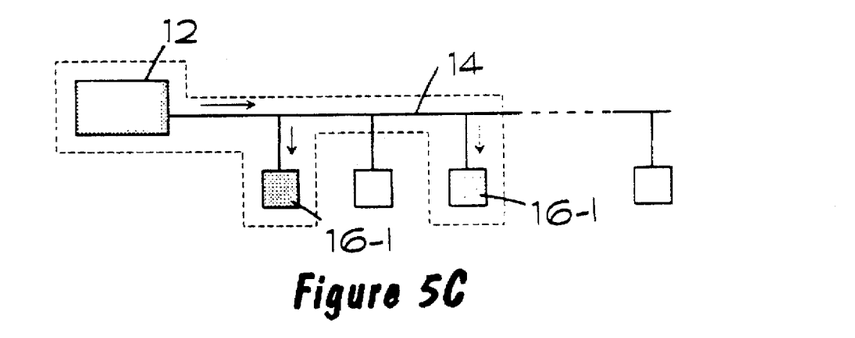
FIG. 5C is a schematic diagram illustrating a group broadcast mode from the master unit to a group of remote units.

With reference to FIGS. 5A, 5B and 5C, different modes of operation of the communications protocol over the serial link 14 are illustrated. In the illustrative embodiment there is one master unit 12 and thirty two remote units 16. Each remote unit 16 has a unique primary address (0-31). As shown in FIG. 5A, this permits a selected remote unit 16 to be individually addressed by the master unit 12 and for the selected remote unit 16 to reply. This is the normal response mode. In the normal response mode a command is transmitted by the master unit 12 to only one remote unit 16 and a reply is expected from the selected remote unit 16.

As shown in FIG. 5B, in a broadcast mode the master unit 12 transmits a command to all the available remote units 16 at the same time and does not expect a reply. In the illustrative embodiment, address (FF) is designated as the broadcast address.

As shown in FIG. 5C, a group of remote units, such as input remote units 16-I (or output remote units 16-O), can also be addressed at one time using a group address. In the illustrative embodiment, a group address of (32) can be used for the input remote units 16-I and a group address of (33) can be used for the output remote units 16-O.

Figure 6:
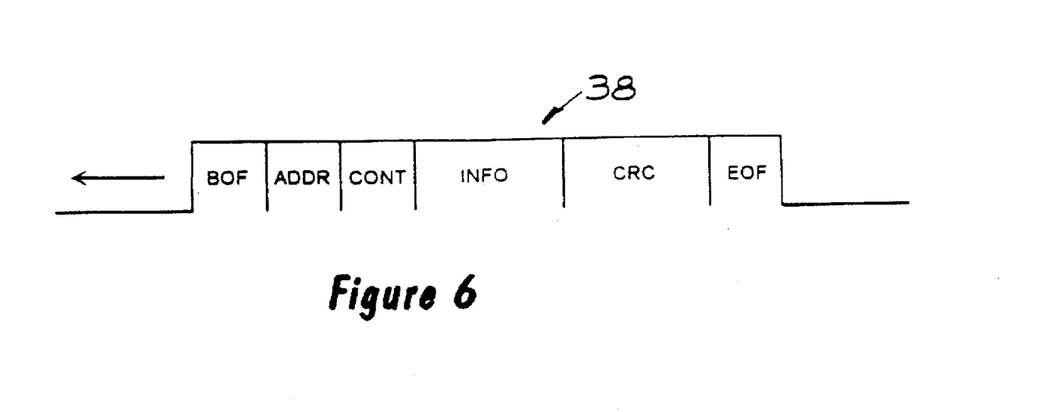
FIG. 6 is a schematic diagram illustrating a frame format for transmissions through the serial link.

With reference to FIG. 6, a transmission frame 38 is shown. In the illustrative embodiment the transmission frames are sixty four bits long, each frame 38 comprises six individual fields as described below:

| Field 1: BOF | Beginning of Frame | (8 bits, always 3Eh) |
| Field 2: ADD | Address Field | (8 bits) |
| Field 3: CONT | Control Field | (8 bits) |
| Field 4: INFO | Information Field | (16 bits) |
| Field 5: CRC | Cyclic Redundancy Check | (16 bits) |
| Field 6: EOF | End of Frame | (8 bit, always 3Eh) |

The above fields are based on the Synchronous Data Link Control (SDLC) frame formats developed by IBM. SDLC is described in IBM publication GA27-3093-3 available from IBM Communication Products Division, Information Development, Department EO2, P.O. Box 12195, Research Triangle Park, N.C. 27709, which is incorporated herein by reference.

The control fields CONT's are constructed in accordance to a predefined set of commands and responses specific to pneumatic control applications. The command frames (from master unit 12 to remote units 16) are constructed using the 8-bit control field "CONT". Therefore each command or response frame has an associated "CONT" byte as shown in Table 1.

TABLE 1

| Function Codes | | | | | |
|---|---|---|---|---|---|
| HEX | DEC | BIN | C/R | Acronym | Function Description |
| | | | | | (Basic SI Functions) |
| 01 | 1 | 0000001 | C | OUTE | Info. field contains output data |
| 11 | 17 | 00010001 | R | OUTA | Output data acknowledge |
| 02 | 2 | 00000010 | C | INPR | Request for input data |
| 12 | 18 | 00010010 | R | INPE | Info. field contains input data |
| 03 | 3 | 00000011 | C | DIAR | Request for diagnostics data |
| 13 | 19 | 00010011 | R | DIAE | Info. field contains diag. data |
| | | | | | (Supervisory Functions) |
| 90 | 144 | 10010000 | R | RIM | Request for initialization |
| 80 | 128 | 10000000 | C | SIM | Set initialization mode |
| 81 | 129 | 10000001 | C | XIDR | Request for station ID |
| 91 | 145 | 10010001 | R | XIDE | Info. field contains station ID |
| 82 | 130 | 10000010 | C | NRM | Set normal response mode |
| 83 | 131 | 10000011 | C | RCM | Set receive only mode |
| 84 | 132 | 10000100 | C | DISC | Do not send or receive info. |
| 95 | 149 | 10010101 | R | REQD | This station wants to disconnect |
| 96 | 150 | 10010110 | R | DM | This station is disconnected |
| 97 | 151 | 10010111 | R | ACK | Acknowledgment |
| 88 | 136 | 10001000 | C | TESTC | Info. field contains test pattern |
| 98 | 152 | 10011000 | R | TESTD | Info. field contains test pattern |
| 99 | 153 | 10010001 | R | XRDY | Station is ready |
| 9A | 154 | 10011010 | R | NRDY | Station is not ready |
| 9B | 155 | 10011011 | R | RXNS | Request for re-transmission |
| 9F | 159 | 10011111 | R | BCN | Loss of input |
| | | | | | (Error Messages) |
| F0h | 240 | 11110000 | R | CRCD | CRC error detected |
| F1h | 241 | 11110001 | R | ILLD | Illegal data |
| F2h | 242 | 11110010 | R | ILLA | Illegal address |
| F3h | 243 | 11110011 | R | ILLC | Illegal command/reply |
| F4h | 244 | 11110100 | R | NREP | Not reply within specified time |
| F5h | 245 | 11110101 | R | BUSY | Busy, rejected reply |
| F6h | 246 | 11110110 | R | IERR | Initialization did not complete |
| F7h | 247 | 11110111 | R | UERR | Undefined error |

Operation

Figure 7:
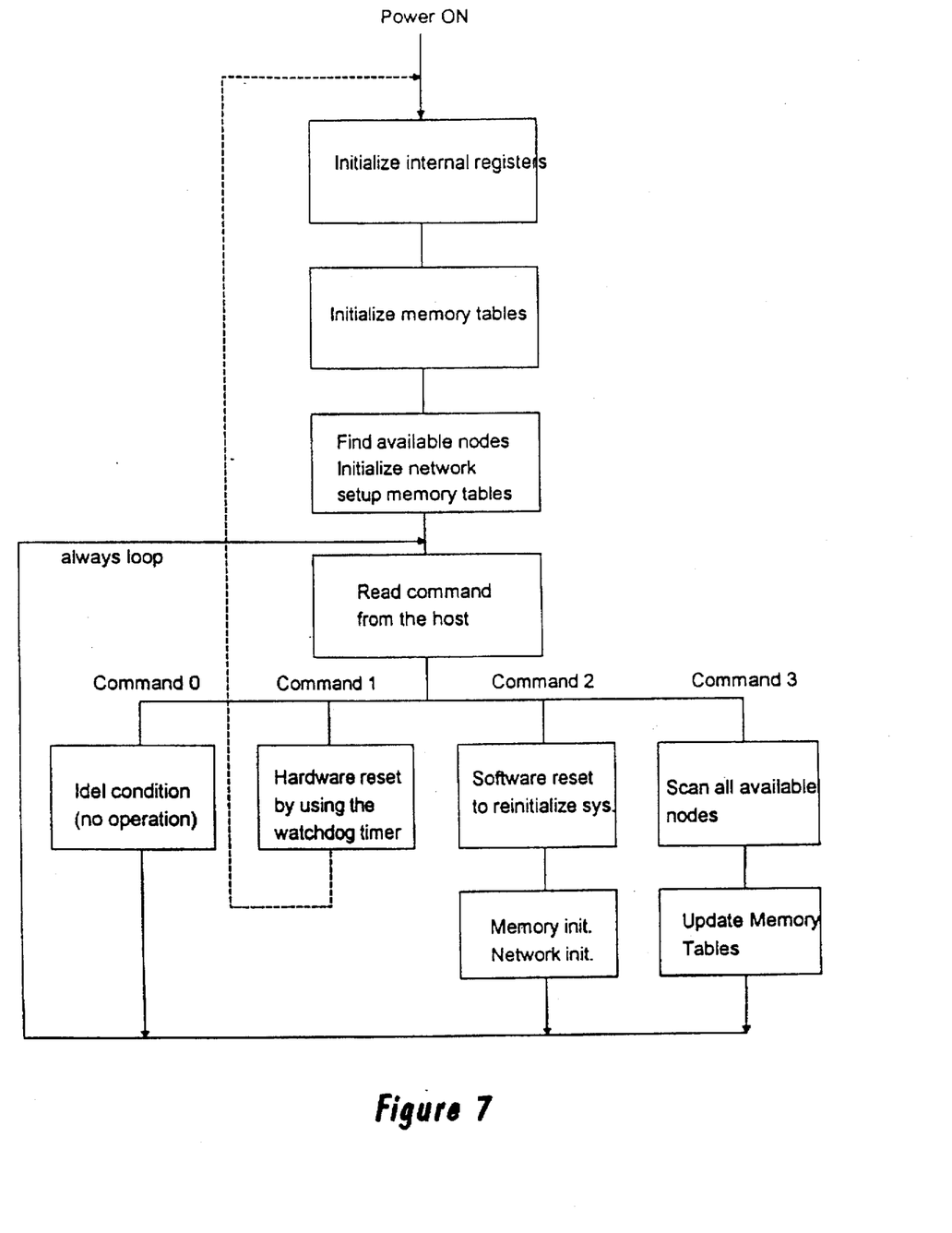
FIG. 7 is a schematic diagram illustrating a software format for the master unit.

FIG. 7 is a software diagram that summarizes the operation of the master unit 12. The master unit 12 initializes its internal registers and memory tables after each power-on condition. It then broadcasts the initialization command (SIM) to all the remote units 16. This causes all the remote units 16 (i.e., nodes) to reset their hardware and initialize their internal registers and memory tables. The master unit 12 then polls all 32 possible addresses for the available remote unit 16. If a remote unit 16 does not respond within a given time frame, the master unit 12 assumes that node does not exist and continues the polling to the next addressable node.

After the initialization process, the master unit 12 goes into an idle mode (command 0) waiting for the scanning command (command 3). Once the scanning command is given to the master unit 12 from the PC 20 (FIG. 2A or host controller 24 (FIG. 2B), it begins sending appropriate commands to the available nodes and receives their responses. A typical command for an output device is "OUTE" and the information field contains the output data corresponding to the output channels.

In case of an error during the command or reply transmissions, the master unit 12 discards the data and repeats the original command. This process may be repeated several times depending on the preset retry number of the master board for the master unit 12. If the error is not corrected after the maximum number of retries, it is reported by the master unit 12 using an error table. The remote unit 16 also indicates the error condition using an error LED.

After a successful command/reply exchange, the master unit 12 proceeds to the next available node. This process is repeated for all the available nodes. At the end of each scan the master unit 12 updates its internal memory tables containing the input/output information. The information from the memory tables is shared with the PC 20 or host controller 24.

Figure 9A:
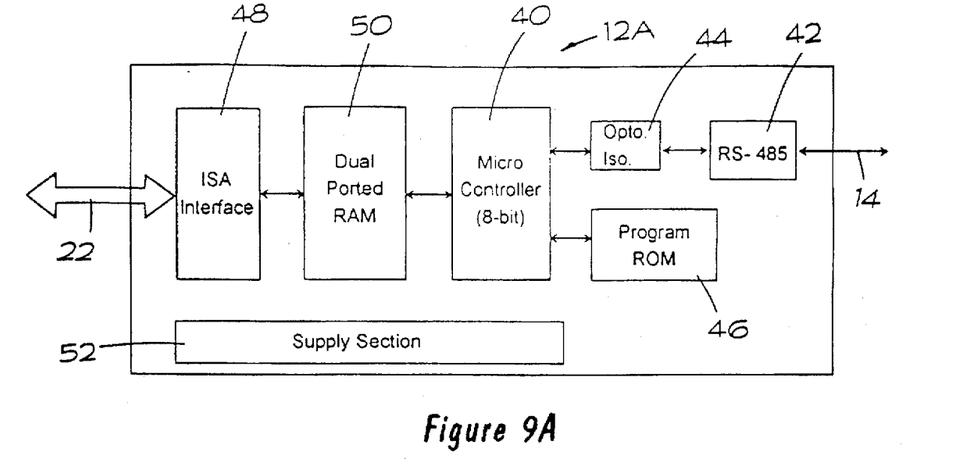
FIG. 9A is a schematic diagram illustrating a hardware configuration for a master unit constructed as shown in FIG. 2A and connected to a PC using an ISA bus.
Figure 9B:
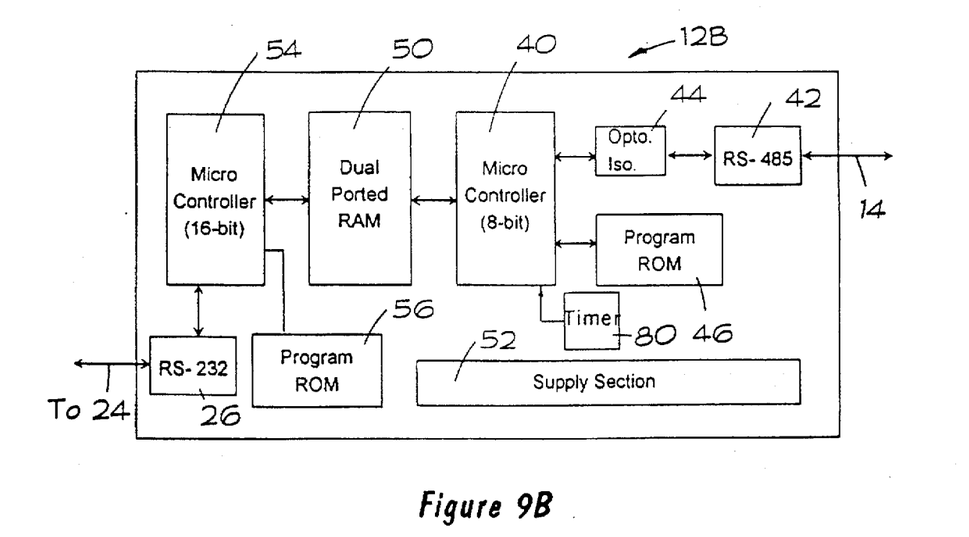
FIG. 9B is a schematic diagram illustrating a hardware configuration for a master unit constructed as shown in FIG. 2B standing alone and communicating with a host controller.

Command 1 is a hardware reset that is initiated by a watchdog timer 80 (FIG. 9B). With command 1 the master unit 12 is reset and re-initialized. After this the master unit 12 re-initializes the network by resetting all the remote units 16 and polling for the available units in the system. The master unit 12 also checks the transmission speed of all the remote units 16 which must be the same. If a remote unit has the wrong speed setting, the master unit 12 sets the remote unit 16 into an error stop mode. Command 2 is a software reset which reinitializes the system. After initialization is finished the master unit 12 returns to command 0.

FIG. 7 illustrates the basic software arrangement using four commands (commands 0–3). Additional commands can be added. As an example, command 4 can be a multi check scan. With this command the master unit 12 starts a multiple check scan. In this mode of operation, the input/output data on the shared memory is updated each time a remote unit 16 is polled. If there is an error while communicating with a remote unit 16, the master unit 12 will try to communicate as many times as specified by the user. If the error persists, the master unit 12 will proceed with the next remote unit 16, and the remote unit 16 with communications problems will be polled again in the next scan. A default number of retries can be set at three times and changed by the user.

A command 5 can be added as a safety scan. This mode of operation works the same as command 4 with the difference that if the master unit 12 cannot communicate with a remote unit 16 after reaching the specified number of retries, the master unit 12 will stop the system and go into the idle mode (command 0). The master unit 12 will try to set the remote unit 16 with problems into error stop mode before going into idle mode. If the system stops it will be necessary to reinitialize the system before starting the operation again.

Figure 8:
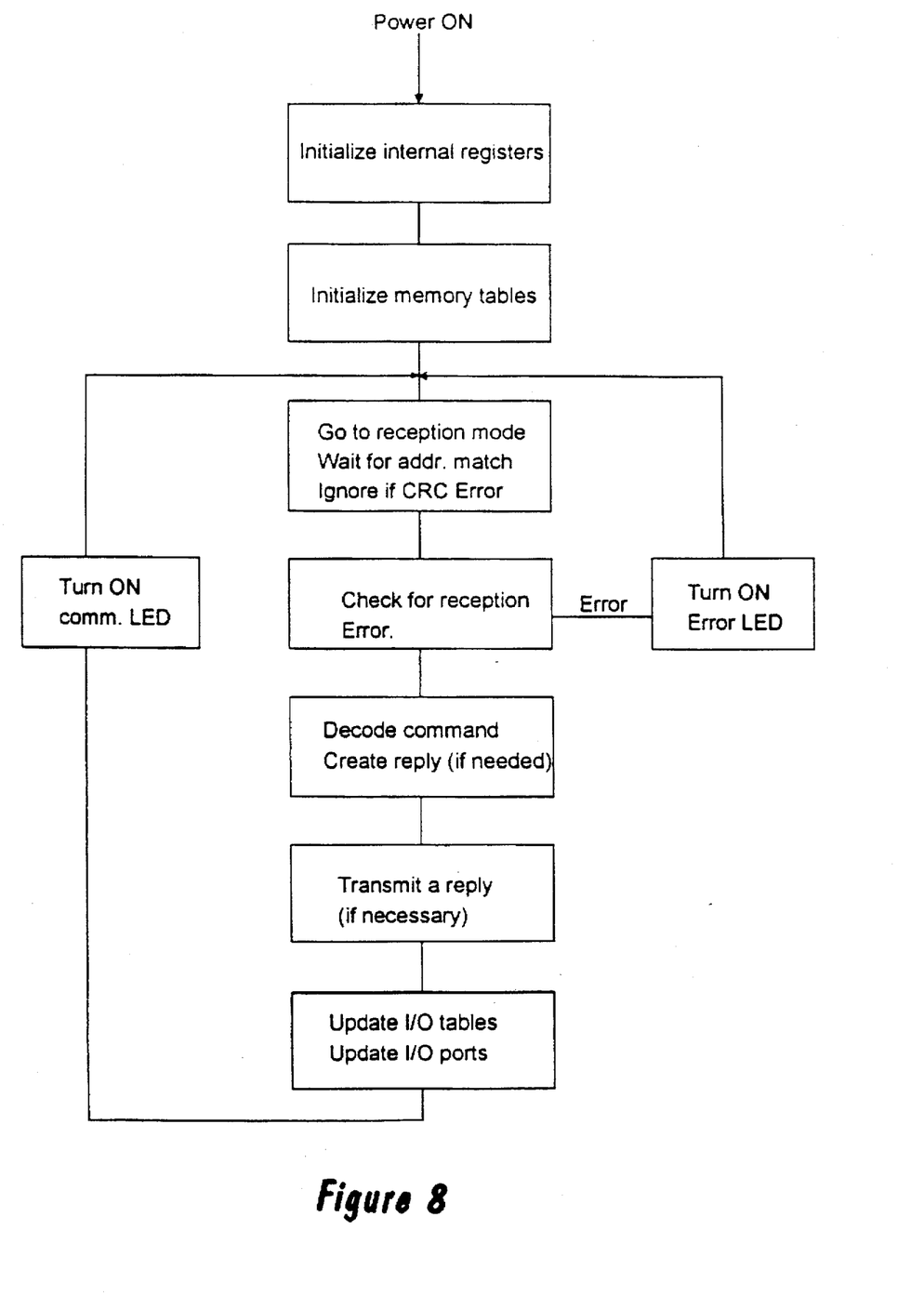
FIG. 8 is a schematic diagram illustrating a software format for a remote unit.

FIG. 8 is a software diagram that summarizes the operations sequence for the remote units 16. The basic operation of the remote units 16 is relatively simpler than the master unit 12. After a power on condition, each remote unit 16 performs its internal initialization, then begins monitoring the serial link 14. Once a frame is received with matching address, the unit decodes the control byte and makes an appropriate reply. It then updates its memory tables and input/output ports before beginning to monitor the serial link 14 again.

Hardware (Master Unit)

A suitable hardware configuration for the plug-in card master unit 12A (FIG. 2A) is shown in FIG. 9A. A suitable hardware configuration for the stand alone master unit 12B (FIG. 2B) is shown in FIG. 9B.

With reference to FIG. 9A, the plug-in card master unit 12A includes an 8-bit programmable microcontroller 40 such as an Intel 80C152. The microcontroller 40 is responsible for the communications and updating of the memory tables. The memory table reside both internal to the microcontroller 40 (internal RAM) and also in the Dual-Port-RAM (external RAM). Some of the tables require faster service, so they are configured in the internal RAM, most of the others are in the external RAM. The microcontroller 40 also has 256 bytes of internal memory which is used for its internal memory tables and registers. A dual ported random access memory (RAM) 50 provides 2K bytes of additional memory and permits sharing of input/output information with the PC 20. The ISA bus 22 connects the master unit 12A to the PC 20 (FIG. 2A). An ISA interface section 48 connects the microcontroller 40 to the ISA bus 22. The ISA interface section 48 allows mapping of the master unit memory into the RAM address for the PC 20. An RS-485 transceiver 42 is used for connecting the microcontroller 40 to the serial link 14. The RS-485 transceiver 42 is optically isolated from the rest of the circuits by optical isolation 44 (e.g., optocouplers). Alternately other techniques can be used to provide noise immunity (e.g., analog filters, hysteresis circuits). A 32K byte program ROM 46 contains the master unit firmware. The master unit 12A also includes a supply section that contains a DC/DC converter to provide isolation voltage for the optocoupler circuits.

With reference to FIG. 9B, the stand alone master unit 12B includes the 8-bit microcontroller 40, program ROM 46, optical isolation 44, transceiver 42, supply section 52 and dual ported random access memory (RAM) 50 as previously described. In addition, the stand alone master unit 12B includes a 16-bit microcontroller 54 (Intel 8xC186) which acts as a host to the master unit 12B. The microcontroller 54 includes a control program read only memory (ROM) 56 that configures the serial transmission parameters and determines the input/output values. There is also an RS-232 transceiver 26 from the microcontroller 54 for downloading of the control program or monitoring of the input/output information on the host controller 24. In addition, a watchdog timer 80 is connected to the micro controller 40 as a hardware reset.

Hardware (Remote Units)

Figure 10:
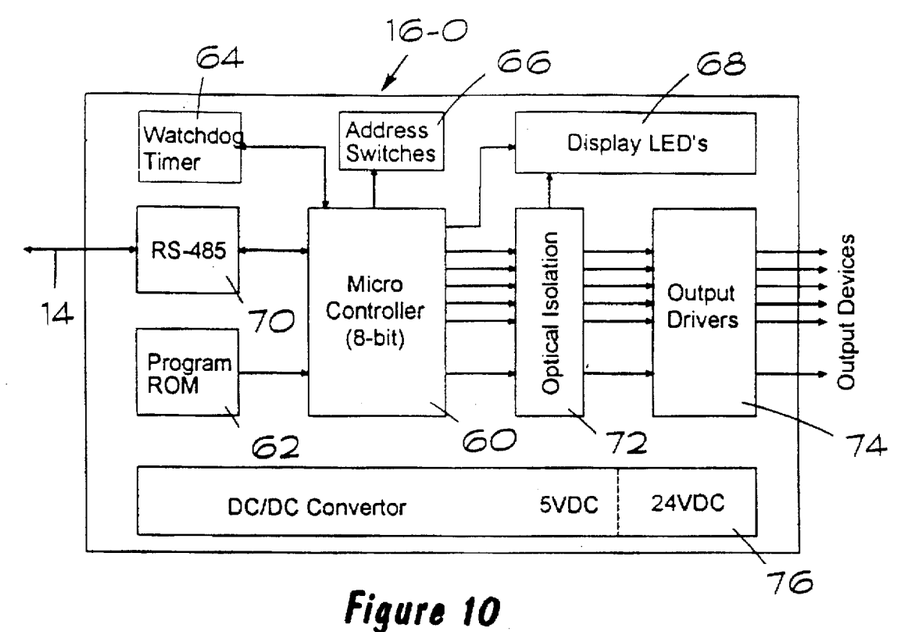
FIG. 10 is a schematic diagram illustrating a hardware configuration for an output remote unit.
Figure 11:
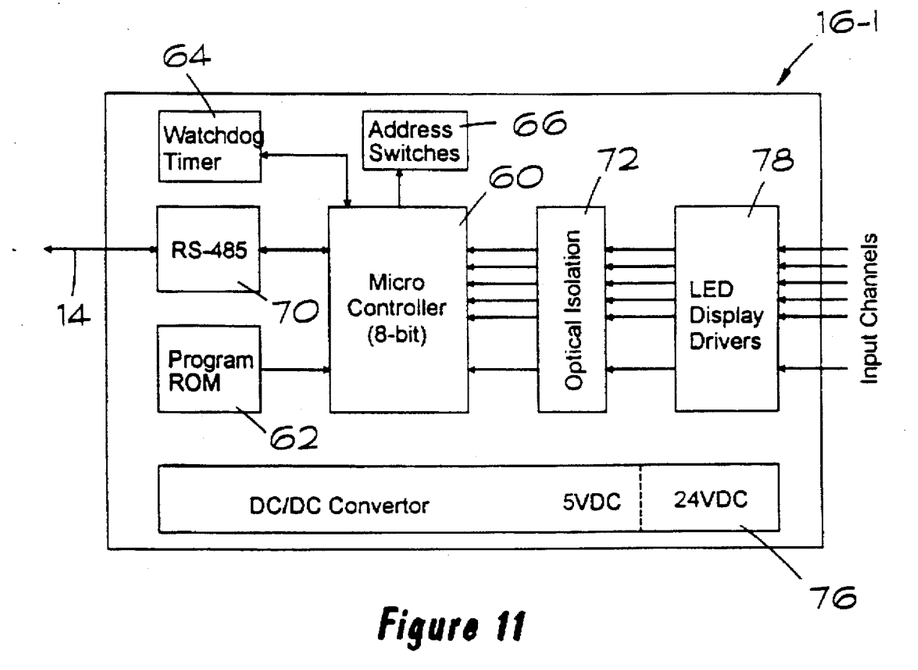
FIG. 11 is a schematic diagram illustrating a hardware configuration for an input remote unit.

As previously stated, there are two basic types of remote units 16. FIG. 10 shows an output remote unit 16-O and FIG. 11 shows an input remote unit 16-I. The remote units are powered by a separate power supply (e.g., +24V) for isolation purposes.

With reference to FIG. 10, output remote unit 16-O includes an 8-bit programmable microcontroller 60 (Intel 80C152) which is responsible for handling the serial transmission commands and also controlling their input or output channels. The microcontroller 60 is connected to a program ROM 62, to a watchdog timer 64 (e.g., 12 Mhz clock), to address switches 66 and to display LED's 68. The output remote unit 16-O also includes an RS-485 transceiver 70. In addition, the microcontroller 60 is optically isolated from the rest of the circuits by optical isolation 72 (e.g., optocouplers). In addition, the remote output units 16-O include output drivers 74 in electrical communication with output devices O1–O2 (FIG. 3). Additionally, the output remote units 16-O include a DC/DC converter 76 for converting from 24VDC to 5VDC. The converter 76 also functions to isolate the remote output units 16-O from the separate power supply for the remote units 16.

With reference to FIG. 11, the remote input units 16-I are constructed with substantially the same components as the remote output units 16-O (FIG. 10) but include LED display drivers 78 rather than output drivers 74 (FIG. 10). The LED display drivers 78 connect to input channels which are in electrical communication with the input devices (I-1)–(I-3) (FIG. 3). The remote input units 16-I are configured to include a bias voltage to operate with active as well as passive switches.

Serial communication between the master unit 12 and the remote units 16 can be performed at four different transmission speeds which are hardware selectable using built in DIP remote switches on each remote unit 16. The DIP switches for the remote units 16 are connected to one of the 7 available ports on the microcontroller 40. Each dip switch occupies an 8-channel port. The microcontroller 40 reads the switch settings after each power reset; then translates that into node address, transmission speed, and error state settings. Alternately, the transmission speed is software selectable by sending a command from the personal computer 20 (FIG. 2A) or host controller 24 (FIG. 2B). The four transmission speeds and respective transmission distances are: 1.5 Mbps (75 m), 750 Kbps (200 m), 500 Kbps (500 m), and 100 Kbps (1000 m).

While the invention has been described with reference to certain preferred embodiments, as will be apparent to those skilled in the art, certain changes and modifications can be made without departing from the scope of the invention as defined by the following claims.

What is claimed is:

1. A serial transmission system comprising:
   a serial link including a signal high wire, a signal low wire and a ground wire;
   an output remote unit for controlling an output device said output remote unit including a transceiver in electrical communication with the serial link and a microcontroller;
   an input remote unit for receiving data from an input device, said input remote unit including a transceiver in electrical communication with the serial link and a microcontroller; and
   a master unit for transmitting and receiving signals over the serial link, said signals being included in transmission frames wherein each said transmission frame is the same length and includes a control field and an information field, said master unit including a transceiver in electrical communication with the serial link, said master unit including a programmable microcontroller for initiating a predetermined communications protocol with the output remote unit and the input remote unit, said master unit including a memory for storing data.

2. The system as claimed in claim 1 and wherein the master unit further comprises a dual ported random access memory for sharing the data stored in the memory.

3. The system as claimed in claim 2 and wherein the dual ported random access memory is connected to a personal computer using an ISA bus.

4. The system as claimed in claim 2 and wherein the master unit includes a second programmable microcontroller in electrical communication with the dual ported random access memory and with a host controller.

5. The system as claimed in claim 1 and further comprising means for isolating the microcontrollers in the master unit, the input remote unit and the output remote unit.

6. The system as claimed in claim 5 and wherein the means for isolating includes optocouplers.

7. The system as claimed in claim 1 and wherein the serial link is a three wire shielded cable.

8. The system as claimed in claim 1 and wherein the communications protocol is a synchronous data link communications protocol.

9. A serial transmission system for controlling a network of output devices and input devices, said system comprising:
   a serial link including a signal high wire, a signal low wire and a ground wire;
   a plurality of output remote units for controlling the output devices, said output remote units connected in series to said serial link, each said output remote unit including a programmable microcontroller and a transceiver in electrical communication with the serial link;
   a plurality of input remote units for receiving data from said input devices, said input remote units connected in series to said serial link, each said input remote unit including a programmable microcontroller and a transceiver in electrical communication with the serial link; and
   a master unit for transmitting and receiving signals over the serial link, said signals being included in transmission frames wherein each said transmission frame is the same length and includes a control field and an information field, said master unit including a transceiver in electrical communication with the serial link, said master unit including a programmable microcontroller with a memory for storing data and adapted to initiate a synchronous data link control communications protocol with the output remote units and the input remote units, said master unit further including a dual ported memory for sharing the data.

10. The system as claimed in claim 9 and wherein the data includes input/output, error, diagnostic, status and node availability information.

11. The system as claimed in claim 10 and wherein the data is shared with a personal computer connected to the master unit using a bus.

12. The system as claimed in claim 11 and wherein the personal computer includes a program for setting initial settings of the master unit and to direct the master unit to reset, initialize and scan.

13. The system as claimed in claim 9 and wherein the data is shared with a host controller connected to the master unit via a transceiver.

14. The system as claimed in claim 13 and wherein the host controller includes a program for setting initial settings of the master unit and for directing the master unit to reset, initialize and scan.

15. A serial transmission system for controlling a network of output devices and input devices, said system comprising:
   a serial link including a signal high wire, a signal low wire and a ground wire;
   a plurality of output remote units for controlling the output devices, said output remote units connected in series to said serial link, each said output remote unit including a programmable microcontroller and a transceiver in electrical communication with the serial link;
   a plurality of input remote units for receiving data from said input devices, said input remote units connected in series to said serial link, each said input remote unit including a programmable microcontroller and a transceiver in electrical communication with the serial link;
   a master unit for transmitting and receiving data signals over the serial link, said master unit including a transceiver in electrical communication with the serial link, said master unit including a programmable microcontroller with a memory for storing data and adapted to initiate a predetermined communications protocol with the output remote units and the input remote units, said master unit including a dual ported memory for sharing the data;

said communications protocol including a transmission frame with a control field having predetermined command bytes for initiating commands and receiving responses from the output remote unit and input remote unit.

16. The system as claimed in claim 15 and wherein the communications protocol is based on synchronous data link control frame formats.

17. The system as claimed in claim 15 and wherein the transmission frame must be of a constant, predetermined length.

18. The system as claimed in claim 15 and further comprising software for directing the programmable microcontroller for the master unit to initialize, to reset, to scan, and to maintain an idle condition.

19. The system as claimed in claim 15 and further comprising software for directing the programmable microcontrollers for the remote output units and the remote input units to initialize, to check for reception errors, to decode commands, to transmit a reply if necessary and to update tables and ports.

20. The system as claimed in claim 15 and wherein the remote input units and the remote output units are connected to a separate power supply.

* * * * *